(12) United States Patent
Yamaoka et al.

(10) Patent No.: US 9,781,881 B2
(45) Date of Patent: Oct. 10, 2017

(54) LAWN MOWER WITH REINFORCED DECK

(71) Applicant: CHERVON INTELLECTUAL PROPERTY LIMITED, Road Town (VG)

(72) Inventors: Toshinari Yamaoka, Nanjing (CN); Qian Liu, Nanjing (CN); Haishen Xu, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 0 days.

(21) Appl. No.: 14/980,959

(22) Filed: Dec. 28, 2015

(65) Prior Publication Data

US 2016/0183457 A1 Jun. 30, 2016

(30) Foreign Application Priority Data

Dec. 30, 2014 (CN) .................... 2014 2 0858173 U

(51) Int. Cl.
*A01D 34/81* (2006.01)
*A01D 101/00* (2006.01)

(52) U.S. Cl.
CPC .......... *A01D 34/81* (2013.01); *A01D 2101/00* (2013.01)

(58) Field of Classification Search
USPC ........................................ 56/320.1
See application file for complete search history.

(56) References Cited

U.S. PATENT DOCUMENTS

| | | | | |
|---|---|---|---|---|
| 3,646,739 A | * | 3/1972 | Dahl | A01D 34/828 56/320.1 |
| 4,172,351 A | * | 10/1979 | Scanland | A01D 34/81 56/17.4 |
| 5,197,265 A | * | 3/1993 | Hiratsuna | A01D 34/005 56/12.9 |
| 7,171,799 B2 | * | 2/2007 | Takeishi | A01D 34/81 56/320.1 |
| 2003/0163981 A1 | * | 9/2003 | Osborne | A01D 34/81 56/320.1 |
| 2004/0083701 A1 | * | 5/2004 | Brower | A01D 34/826 56/320.1 |

* cited by examiner

*Primary Examiner* — Alicia Torres
(74) *Attorney, Agent, or Firm* — Greenberg Traurig, LLP

(57) ABSTRACT

A lawn mower deck includes a deck body having a through hole. The deck body includes a chute. The chute forms a groove which is around the through hole and opened downwards. Reinforcing members are mounted to both sides of the deck body in the width direction.

4 Claims, 5 Drawing Sheets

LAWN MOWER WITH REINFORCED DECK

RELATED APPLICATION INFORMATION

This application claims the benefit under 35 U.S.C. §119 (a) of Chinese Patent Application No. CN 201420858173.2, filed on Dec. 30, 2014, the disclosure of which is incorporated herein by reference in its entirety.

FIELD OF THE DISCLOSURE

The present disclosure relates generally to garden tools and, more particularly, to a lawn mower with a deck.

BACKGROUND OF THE DISCLOSURE

Lawn mowers are mechanical tools for trimming lawn and grass. Generally, a lawn mower includes a deck, a motor, wheels, a walking mechanism, a cutting blade, a handle mechanism and a control system.

As lawn mowers become wider in size, the decks thereof become wider. For decreasing the manufacturing cost and the weight of such wider lawn mowers, manufacturers traditionally use plastic material to manufacture the lawn mower. However, the mechanical characteristics of plastic material, relative to steel material or aluminum material, have drawbacks with respect to satisfying the strength requirements of the wider decks. For example, during a cutting operation, when the lawn mower meets a barrier, a plastic deck may deform on its sides. As a result, a chute formed on the deck may be influenced and scratched by the cutting blade.

The statements in this section merely provide background information related to the present disclosure and may not constitute prior art.

SUMMARY

In one aspect of the disclosure, a lawn mower deck includes a deck body which is provided with a through hole. The deck body includes a chute. The chute forms a groove which is around the through hole and opened downwards. Reinforcing members are mounted to both sides of the deck body in the width direction.

In yet another aspect of the disclosure, a lawn mower includes a prime mover, a cutting element driven by the prime mover and a deck for supporting the prime mover. The deck includes a deck body which is provided with at least a through hole. The deck body includes a chute. The chute forms a groove which is around the through hole and opened downwards. Reinforcing members are mounted to both sides of the deck body in the width direction.

Further areas of applicability will become apparent from the description provided herein. It should be understood that the description and specific examples are intended for purposes of illustration only and are not intended to limit the scope of the present disclosure.

Figure 1:
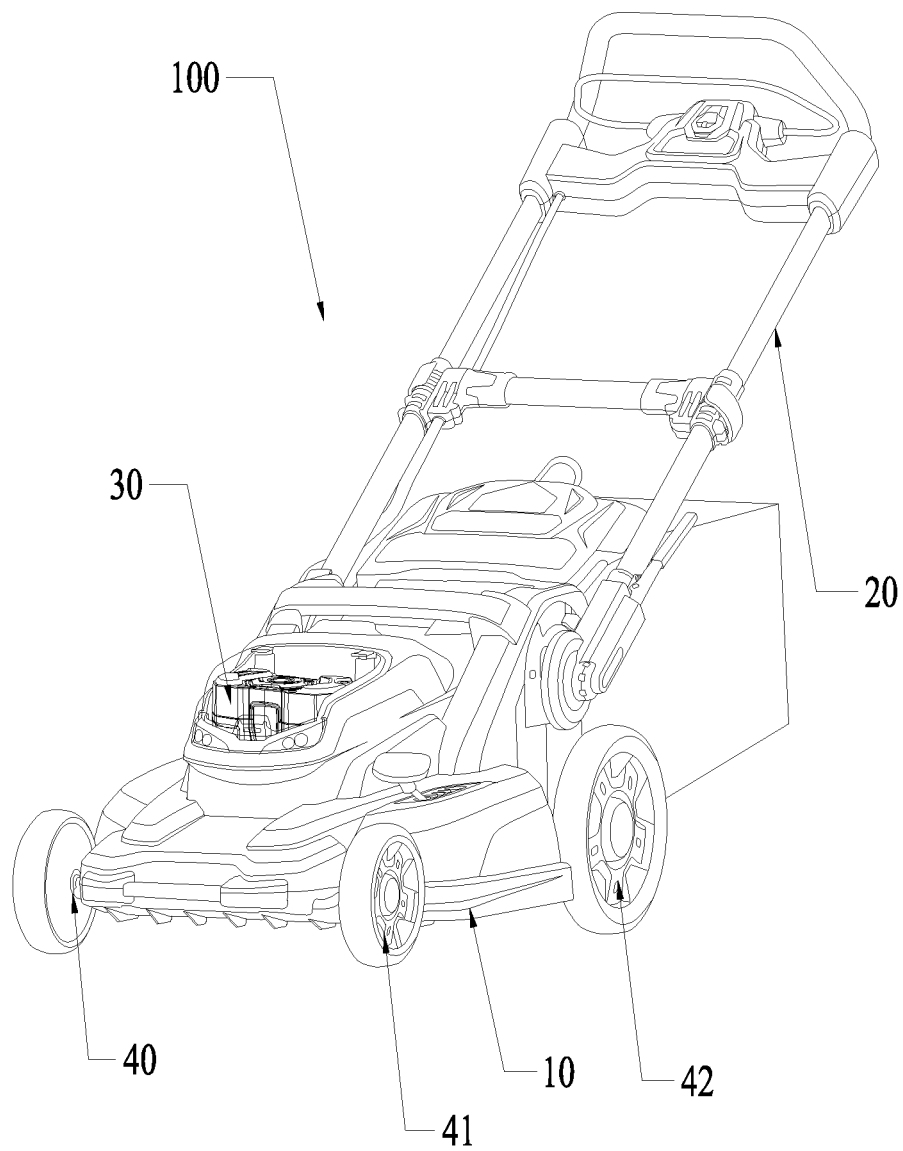
FIG. 1 is a schematic view of an exemplary lawn mower.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

The following description of a preferred embodiment is merely exemplary in nature and is in no way intended to limit the invention hereinafter claimed, its application, or uses.

Figure 2:
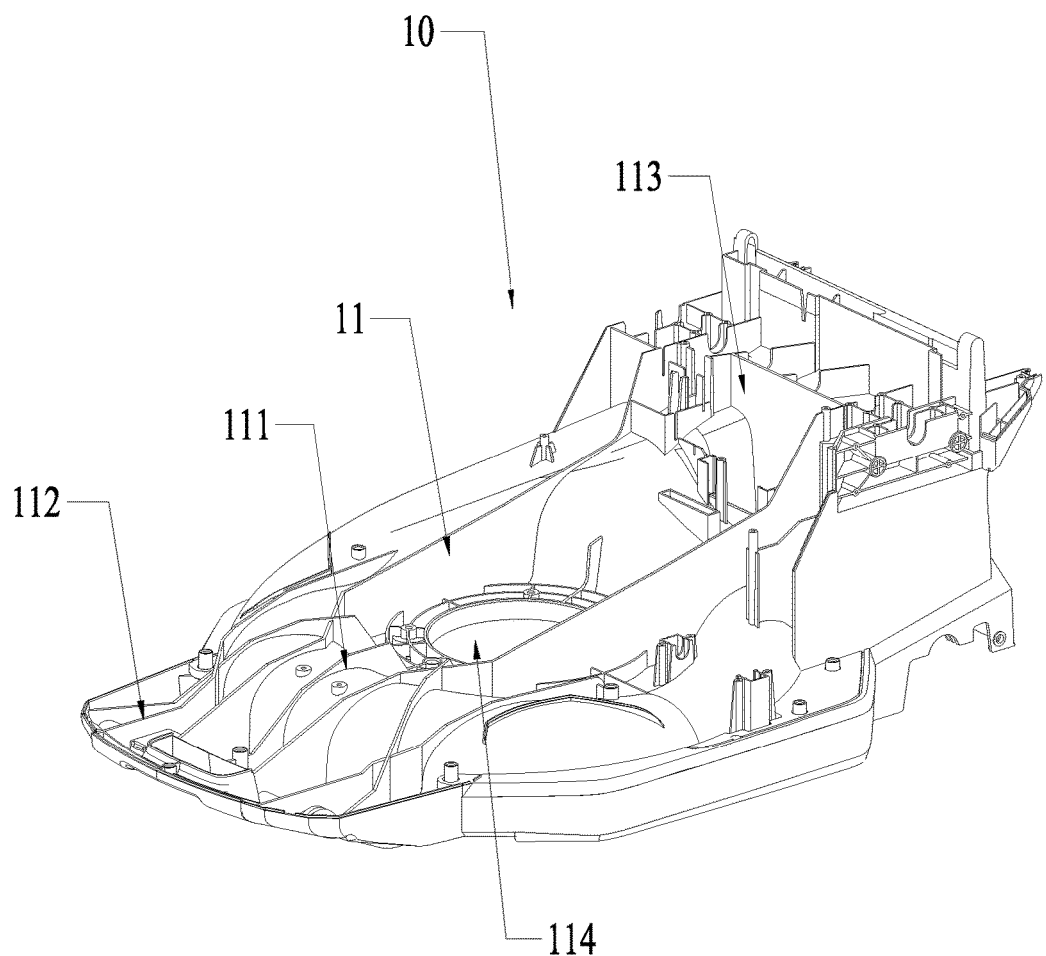
FIG. 2 a schematic view of a deck of the lawn mower in FIG. 1, wherein reinforcing elements are mounted to the deck.
Figure 3:
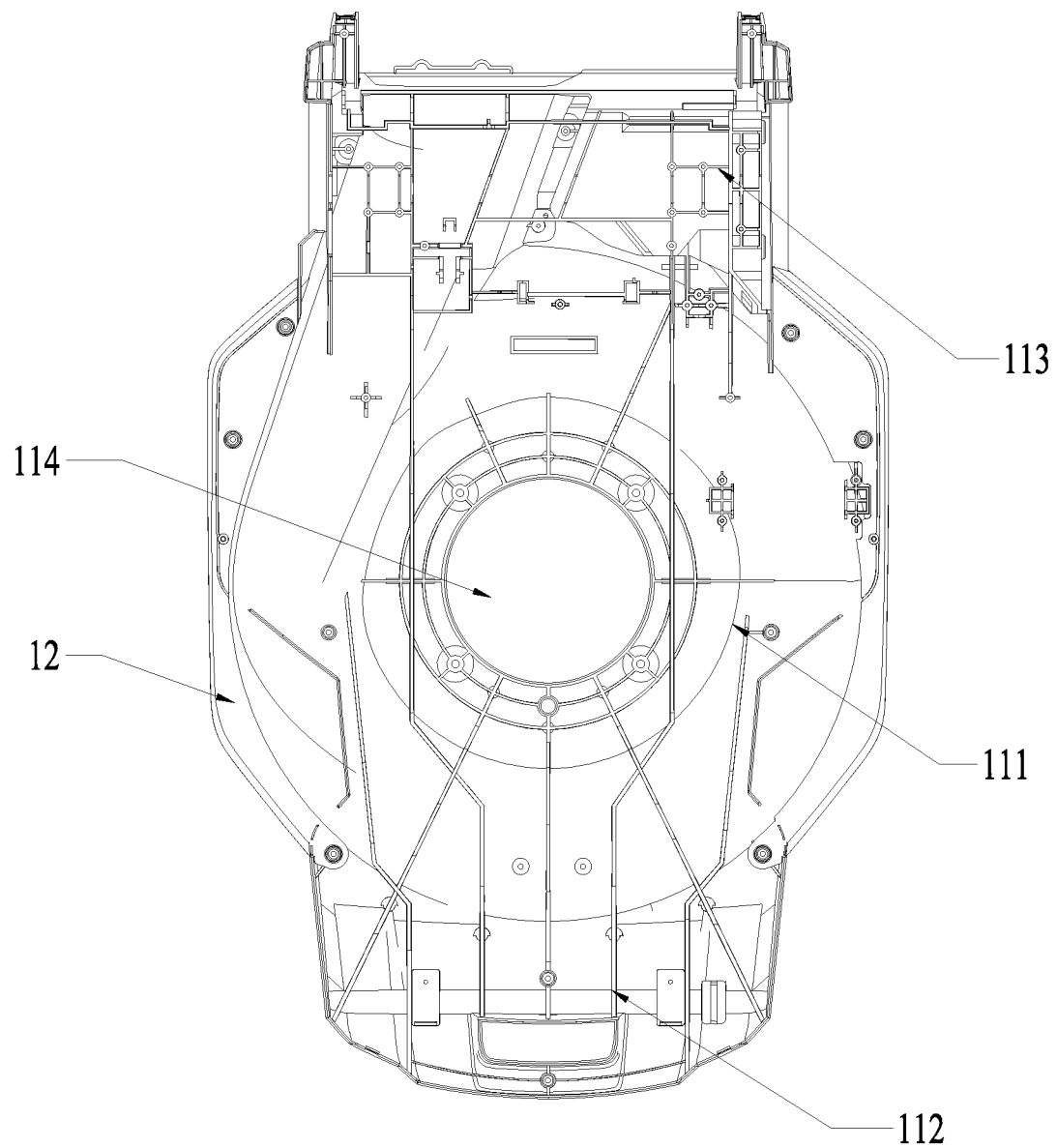
FIG. 3 is a top view of the deck in FIG. 2.
Figure 4:
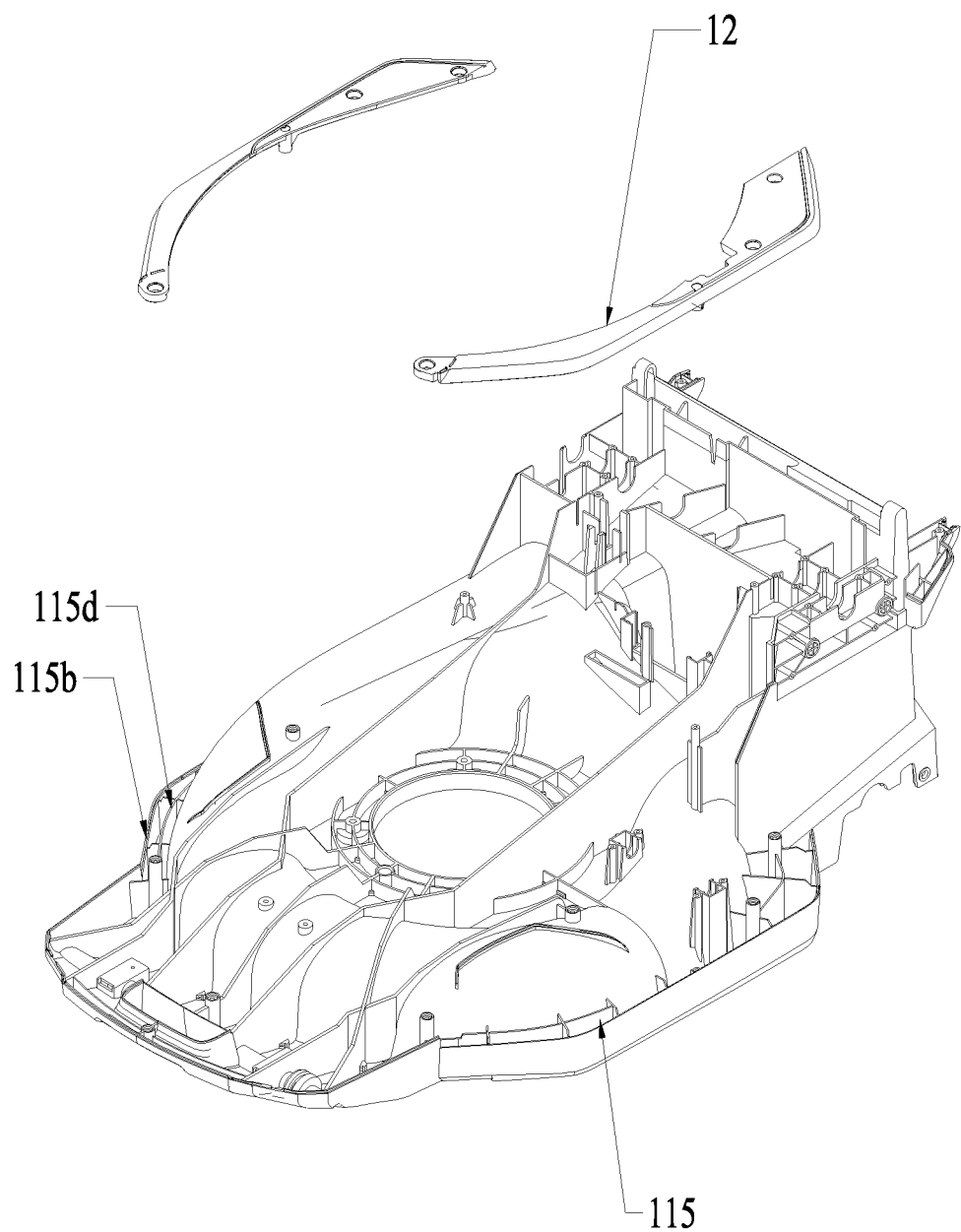
FIG. 4 is an exploded view of the reinforcing elements and the deck in FIG. 2.
Figure 5:
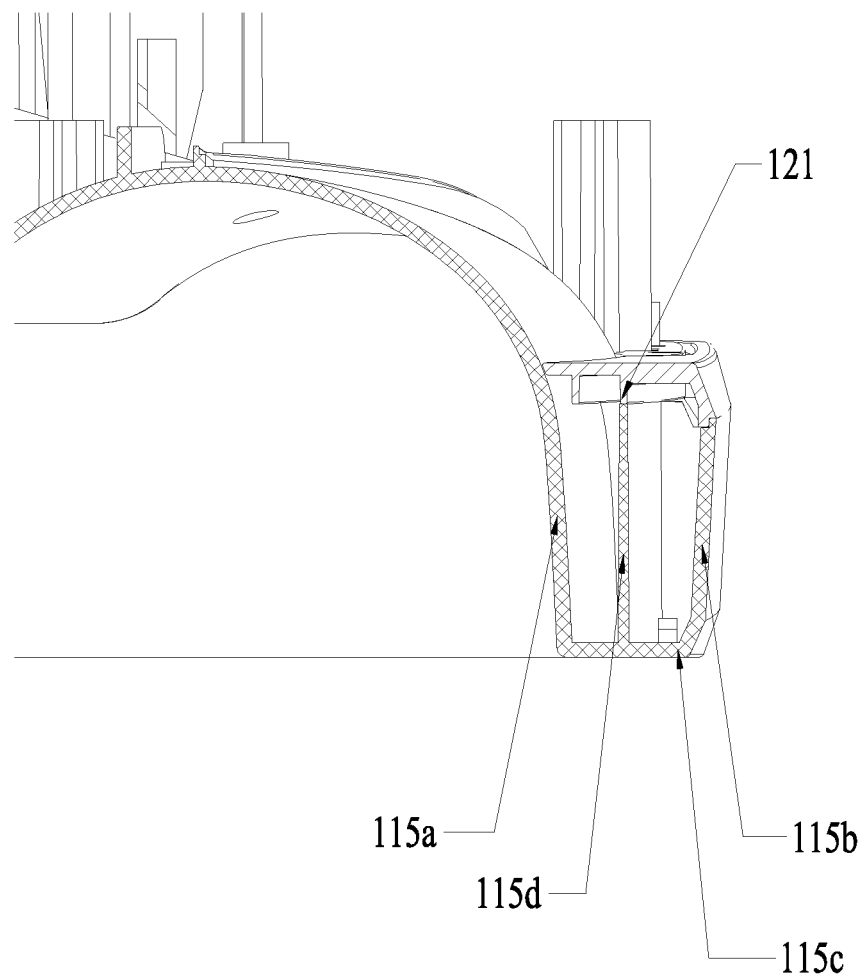
FIG. 5 is a sectional view of the deck.

Referring to FIGS. 1-5, a lawn mower 100 includes a prime mover, a cutting element and a deck 10. It will be appreciated that the lawn mower 100 further includes an operating handle 20 for controlling the prime mover, a power source 30 for supplying power to the prime mover and a wheel assembly 40 for walking the lawn mower 100.

The prime mover is used to drive the cutting element, which can be for example a motor. The cutting element can be a cutting blade operably connected to an output shaft of the motor.

The deck 10 is configured to support the prime mover, the cutting element, the power source 30 and the wheel assembly 40. The prime mover, the cutting element, the power source 30 and the wheel assembly 40 cooperate together as a whole for realizing the cutting operation. The deck 10 includes a deck body 11 and reinforcing elements 12. The deck body 11 includes a chute 111. Preferably, the deck body 11 further includes a front end portion 112 and a rear end portion 113. The front end portion 112 and the rear end portion 113 are respectively the front portion and rear portion of the deck body 11 in the longitudinal direction. The front end portion 112 is in the front end of the chute 111 and protects the front end of the deck body 11 from damage. The wheel assembly 40 includes front wheels 41 and rear wheels 42. The front wheels 41 are mounted to the front end portion 112. The rear end portion 113 is in the back end of the chute 111 and likewise protects the back end of the deck body 11 from damage. The rear end portion 113 is connected with the operating handle 20. The rear wheels 42 are mounted to the rear end portion 113.

The deck body 11 is provided with a through hole 114. The chute 111 forms a groove which is around the through hole 114 and opened downwards. The groove is upheaved from one side of the deck body 11 to the other side. The groove is an air flue for discharging the grass. Preferably, the air flue is annular shaped. Further, the air flue is provided with an air outlet. The air outlet can be connected with a collecting unit for collecting grass. For illustrating the embodiment clearly, it is noted that when the lawn mower 100 is in the operation situation, the side that the deck body 11 is upheaved towards is defined as upside, the opposite of the upside is downside. The side that the front end portion 112 is located is defined as front side in the longitudinal direction of the deck body 11, the side that the rear end portion 113 is located is defined as rear side. The two sides of the deck body 11 that are perpendicular to the longitudinal direction are defined as left side and right side respectively. The above definitions are not intended to limit the invention hereinafter claimed. For further understanding, it is noted that the groove of the chute 111 is a part of the deck body 11 that is around the through hole 114 and upheaved from the down side to the upside.

The reinforcing elements 12 are mounted on both sides of the chute 111 in the width direction of the deck body 11. Also the reinforcing elements 12 are located on the left and right sides of the chute 111. The arrangement of the reinforcing elements 12 is able to enhance the structural strength of the left and right sides of the chute 111 and protect the left and right sides from damage. Thus, the discharging and collecting of grass are not affected by the deformation of the chute 111, and both sides of the deck body 11 are prevented from being scratched by the cutting blade.

Specifically, the deck body 11 is provided with mounting recesses 115 on both sides of the chute 111 in the width direction of the deck body 11. Also, the mounting recesses 115 are located on the left and right sides of the chute 111. Each mounting recess 115 has a general U shape, which includes an inside wall 115a and an outside wall 115b. The inside wall 115a is formed by the outside of the chute 111. The outside wall 115b and the inside wall 115a are connected as a whole by a connecting wall 115c. The inside wall 115a and the outside wall 115b are respectively disposed on the left and right sides of the connecting wall 115c. The reinforcing elements 12 are partially received in the mounting recesses 115. The left and right sides of the reinforcing elements 12 are pressed against the inside wall 115a and the outside wall 115b respectively.

Preferably, the chute 111 has a general arc shape on both sides in the width direction of the deck body 11. Each mounting recess 115 and reinforcing element 12 has a portion with similar, general arc shape which is contacted and engaged with the chute 111. Thereby, the reinforcing elements 12 are able to protect the left and right sides of the chute 111 from damaging.

Preferably, each mounting recess 115 includes supporting ribs 115d which are disposed on the connecting wall 115c. The supporting ribs 115d are extended upwards from the upside of the connecting wall 115c. Each reinforcing element 12 includes supporting parts 121 for contacting with the supporting ribs 115d. With the arrangement of the supporting ribs 115d and the supporting parts 121, the chute 111 has enhanced structural strength and is avoided from being damaged.

The above illustrates and describes basic principles, main features and advantages of the invention hereinafter claimed. Those skilled in the art should appreciate that the above embodiments do not limit the invention hereinafter claimed in any form. Rather, technical solutions obtained by equivalent substitution or equivalent variations are intended to fall within the scope of the invention hereinafter claimed.

What is claimed is:

1. A lawn mower deck comprising:
  a deck body having a through hole, the deck body comprising a chute, the chute forming a groove which is disposed around the through hole and opened downwards; and
  reinforcing members mounted to both sides of the deck body in the width direction;
  wherein the deck body is provided with mounting recesses on both sides of the chute in the width direction of the deck body, each mounting recess comprises two walls, and the reinforcing members are at least partially received in the mounting recesses and pressed against the two walls of the mounting recesses,
  wherein one of the two walls of each mounting recess is formed by the outside of the chute, and
  wherein each mounting recess comprises supporting ribs and each reinforcing member comprises supporting parts for contacting with the supporting ribs.

2. The lawn mower deck of claim 1, wherein the chute has a general arc shape at least on both sides thereof in the width direction of the deck body and each reinforcing member has a portion with a corresponding, general arc shape which is contacted and engaged with the chute.

3. A lawn mower comprising:
  a prime mover;
  a cutting element driven by the prime mover; and
  a deck for supporting the prime mover, the deck comprising a deck body having a through hole, the deck body comprising a chute, the chute forming a groove which is around the through hole and opened downwards, and reinforcing members mounted to both sides of the deck body in the width direction,
  wherein the deck body is provided with mounting recesses on both sides of the chute in the width direction of the deck body, each mounting recess comprises two walls, and the reinforcing members are at least partially received in the mounting recesses and pressed against the two walls of the mounting recesses,
  wherein one of the two walls of each mounting recess is formed by the outside of the chute, and
  wherein each mounting recess comprises supporting ribs and each reinforcing member comprises supporting parts for contacting with the supporting ribs.

4. The lawn mower of claim 3, wherein the chute has a general arc shape at least on both sides thereof in the width direction of the deck body and each reinforcing member has a portion with a corresponding, general arc shape which is contacted and engaged with the chute.

* * * * *